United States Patent
Riggs (10) Patent No.: US 9,240,664 B2
(45) Date of Patent: Jan. 19, 2016

(54) SYSTEM AND METHOD FOR EXTENDING GAS LIFE IN A TWO CHAMBER GAS DISCHARGE LASER SYSTEM

(75) Inventor: Daniel J. Riggs, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 0 days.

(21) Appl. No.: 13/338,580

(22) Filed: Dec. 28, 2011

(65) Prior Publication Data

US 2013/0170516 A1 Jul. 4, 2013

(51) Int. Cl.
*H01S 3/22* (2006.01)
*H01S 3/036* (2006.01)
*H01S 3/104* (2006.01)
*H01S 3/225* (2006.01)
*H01S 3/23* (2006.01)

(52) U.S. Cl.
CPC ............ *H01S 3/036* (2013.01); *H01S 3/104* (2013.01); *H01S 3/225* (2013.01); *H01S 3/2308* (2013.01)

(58) Field of Classification Search
CPC ......... H01S 3/036; H01S 3/104; H01S 3/134; H01S 3/2258
USPC ................................. 372/57, 58, 59
See application file for complete search history.

(56) References Cited

U.S. PATENT DOCUMENTS

| | | | |
|---|---|---|---|
| 7,741,639 B2 * | 6/2010 | Besaucele et al. | 257/55 |
| 7,835,414 B2 * | 11/2010 | Dunstan et al. | 372/59 |
| 7,903,700 B2 | 3/2011 | Nagai et al. | |
| RE42,588 E | 8/2011 | Fallon et al. | |
| 2006/0056478 A1 * | 3/2006 | Albrecht et al. | 372/55 |
| 2008/0285602 A1 * | 11/2008 | Nagai et al. | 372/20 |

* cited by examiner

Primary Examiner — Tod T Van Roy
(74) *Attorney, Agent, or Firm* — Gard & Kaslow LLP (57) ABSTRACT

A method and system for performing injects of halogen gas into the chambers of a two chamber gas discharge laser such as a MOPA excimer laser for allowing operation of the laser within acceptable parameters and compensating for ageing effects without the necessity of performing refills is described. A parameter reflecting efficiency of the laser is measured, and the change in the parameter with respect to the length of laser operation is estimated. The change in the parameter with respect to the pressure in one of the chambers is also measured. At a given time, the total change in the value of the parameter is estimated, and from this change in pressure that is needed to reverse the change in the value of the parameter is calculated. The pressure in the chamber is then changed to correct for the amount of time that the laser has been in operation.

23 Claims, 7 Drawing Sheets

SYSTEM AND METHOD FOR EXTENDING GAS LIFE IN A TWO CHAMBER GAS DISCHARGE LASER SYSTEM

FIELD OF THE INVENTION

The present invention relates generally to laser systems. More specifically, the invention relates to performing injects of reactive gas into the chambers of a gas discharge laser, such as a two chamber Master Oscillator-Power Amplifier excimer laser.

BACKGROUND OF THE INVENTION

One type of gas discharge laser used in photolithography is known as an excimer laser. An excimer laser typically uses a combination of a noble gas, such as argon, krypton, or xenon, and a reactive halogen gas such as fluorine or chlorine. The excimer laser derives its name from the fact that under the appropriate conditions of electrical stimulation and high pressure, a pseudo-molecule called an excimer (or in the case of noble gas halides, an exciplex) is created, which can only exist in an energized state and can give rise to laser light in the ultraviolet range.

Excimer lasers are widely used in high-resolution photolithography machines, and are thus one of the critical technologies required for microelectronic chip manufacturing. Current state-of-the-art lithography tools use deep ultraviolet (DUV) light from the KrF and ArF excimer lasers with nominal wavelengths of 248 and 193 nanometers respectively.

While excimer lasers may be built with a single chamber light source, the conflicting design demands for more power and reduced spectral bandwidth have meant a compromise in performance in such single chamber designs. One way of avoiding this design compromise and improving performance is by utilizing two chambers. This allows for separation of the functions of spectral bandwidth and pulse energy generation; each chamber is optimized for one of the two performance parameters.

Such dual-gas-discharge-chamber excimer lasers are often called Master Oscillator-Power Amplifier, or "MOPA," lasers. In addition to improving the spectral bandwidth and pulse energy, the efficiency of the dual chamber architecture can enable the consumable modules in MOPA lasers to reach longer operational lifetimes than their counterpart modules in single chamber light sources.

In each chamber, as the light source discharges energy across its electrodes to produce light, the halogen gas, fluorine in the case of ArF or KrF lasers, is depleted. This causes a decrease in the laser efficiency which is seen, for example, as an increase in discharge voltage required to create a given desired pulse energy. Since the discharge voltage has an upper limit determined by physical constraints of the hardware, steps must be taken to replenish the lost fluorine so that the voltage remains below this limit and the laser continues to function properly.

One way to do this is with a full replenishment of the gas in the chambers, called a refill, where all of the gas is replaced while the laser is not firing to return the gas content in the chamber to the desired mix, concentration and pressure. However, refills are extremely disruptive as the laser must be shut off during the refill process, and thus the lithographic exposure of semiconductor wafers must also be paused in a controlled manner at the same time and then restarted when the laser is again operational to avoid improper processing of the wafers. For this reason, it is typical to refill both chambers at once to save time, although this is not necessary.

The need for a refill can depend on several complex and often unpredictable variables, including the light source firing pattern and energy, the age of the light source modules, and others that will be familiar to those of skill in the art. For this reason, refills are typically done on a regular schedule, which ensures that the light source operation will never suffer unanticipated interruption due to the light source reaching its operational limit. Such a regular schedule generally yields very conservative upper limits on the time between refills, such that some users of the light source operating at low pulse usages might be able to wait for a much longer period of time between refills than is provided by the simple schedule.

Given the demands of increased throughput and light source availability, efforts have been made to minimize light source stoppage for refills. One way of doing this is by performing a partial replenishment of the gas in the chambers, known as an inject, rather than a full refill. As long as the laser is able to continue to operate within certain parameters, it is not necessary to shut the laser down for the inject, and thus processing may continue during the inject process.

Another factor that decreases efficiency is the ageing of the laser; older excimer lasers are in general less efficient than newer ones. However, it can be difficult to separate the effects of ageing from the effects of fluorine concentration that is not optimal, particularly when the control of the fluorine is not precise.

A number of prior methods and systems have been described for managing injects, including, for example, how to determine when an inject should occur and the amount of halogen gas to be provided by the inject. See, for example, U.S. Pat. Nos. 7,741,639 and 7,835,414, owned by the assignee of the present application. However, such prior art still requires that a refill be done at some point to keep the laser within operating parameters.

Further, many of these prior art techniques do not have adequate control of the fluorine concentration to be able to tell whether a given loss of efficiency is due to the fluorine level or to the ageing of the laser. As a result, those using such prior art techniques generally assume that any loss of efficiency is due to a fluorine problem and attempt to adjust the fluorine to compensate, and thus do not compensate for the ageing of the laser in any way.

It would be desirable to have a method that allows a laser to operate within acceptable parameters for a longer period of time using only injects rather than refills to replenish the gas in the chambers, so that the laser need not be shut off during the refill procedures. It would also be desirable to be able to compensate for the ageing of the laser as part of such a method using only injects rather than refills.

SUMMARY OF THE INVENTION

Systems and methods for operating a dual chamber gas discharge laser, such as a MOPA excimer laser, using only injects rather than refills while compensating for the ageing of the laser by increasing the pressure in one or both of the chambers are disclosed.

In one embodiment, a dual chamber gas discharge laser light source is described, comprising a master oscillator and an amplifier, each of the master oscillator and amplifier having a laser chamber containing a lasing medium gas comprising a halogen, and a gas replenishment system including a controller executing a replenishment scheme at regular intervals, the replenishment scheme comprising injecting into the selected laser chamber at each inject opportunity a quantity of a non-halogen containing gas and a quantity of the halogen containing gas estimated to result in a desired amount of halogen gas in the chamber after the inject opportunity; and after each N injects, where N is a predetermined number, adjusting the pressure in the chamber to compensate for any change in the efficiency of the laser due to the length of operation of the laser.

In another embodiment, a method of replenishing gas in a dual chamber gas discharge laser light source having a master oscillator and an amplifier is described, each of the master oscillator and amplifier having a laser chamber containing a lasing medium gas comprising a halogen, the method comprising the steps of: selecting a plurality of inject opportunities occurring at regular intervals; injecting into the selected laser chamber at each inject opportunity a quantity of a non-halogen containing gas and a quantity of the halogen containing gas estimated to result in a desired amount of halogen gas in the chamber after the inject opportunity; and after each N injects, where N is a predetermined number, adjusting the pressure in the chamber to compensate for any change in the efficiency of the laser due to the length of operation of the laser.

Still another embodiment discloses a non-transitory computer-readable medium having embodied thereon a program, the program being executable by a processor to perform a method of automatically replenishing the gas in a laser chamber of a dual chamber gas discharge laser light source having a master oscillator and an amplifier, each of the master oscillator and amplifier having a laser chamber containing a lasing medium gas comprising a halogen, the method comprising the steps of: selecting a plurality of inject opportunities occurring at regular intervals; injecting into the selected laser chamber at each inject opportunity a quantity of a non-halogen containing gas and a quantity of the halogen containing gas estimated to result in a desired amount of halogen gas in the chamber after the inject opportunity; measuring an operating parameter of the selected laser chamber that is indicative of the efficiency of the laser during each injection of gas into the chamber; estimating the ratio of the change of the measured operating parameter to the number of shots fired by the laser; measuring the change in pressure during each inject opportunity; determining the ratio of the change of the measured operating parameter to the change in pressure in the chamber; and after each N injects: estimating the change in the operating parameter over the N injects; estimating the pressure in the chamber that is appropriate to reverse the change in the operating parameter over the N injects; and adjusting the pressure in the chamber to the estimated pressure.

DETAILED DESCRIPTION OF THE INVENTION

The present application describes a method and system for performing injects of halogen gas into the chambers of a two chamber gas discharge laser such as a MOPA excimer laser for the purpose of allowing operation of the laser within acceptable parameters without the necessity of performing refills. The method also allows for automatic compensation for the ageing of the laser by increasing the pressure in the chambers over time. While manual adjustments to pressure have been made previously, it is believed that such automatic and substantially continuous gas optimization without the need of refills has not previously been suggested or attempted in the prior art.

It is expected that an inject process as described herein will result in an increased period of operation of the laser without needing to suspend operation during refills, as well as greater efficiency due to the compensation for ageing of the laser. A parameter indicative of the performance of the laser is measured, and the change in the parameter with respect to the length of operation of the laser is estimated to determine the ageing rate of the laser. The change in the parameter with respect to the pressure in one of the chambers is also measured to determine the change in efficiency due to pressure. At a selected time, the total change in the value of the parameter is estimated, indicting the decrease in performance of the laser, and from this the amount of change in pressure that is needed to reverse the change in the value of the parameter is calculated. The pressure in the chamber is then changed, thus improving the performance of the laser to correct for the amount of time that the laser has been in operation.

There are a number of parameters indicative of the laser performance that may be selected. In many cases, laser efficiency may be the easiest parameter to use. However, other parameters may be selected if desired; for example, when considering injects to the power amplifier chamber, the parameter may be the discharge voltage, while in the case of the master oscillator chamber the parameter may be the delay time ("dtMOPA") between an electrical discharge in the master oscillator chamber that creates a laser shot and the subsequent electrical discharge in the power amplifier chamber that amplifies the shot.

Still other parameters may be used, such as bandwidth, which may be measured by the integral of a certain percentage of the energy contained on either side of a center wavelength of a spectrum centered on the center wavelength. One bandwidth measure used in other contexts is the integral of 95% of the energy is common and is known as E95% or simply E95. Another parameter that may be used is the common voltage applied to both chambers, for example, at the peaking capacitor of a compression head of a solid state pulsed power system (SSPPM) for each chamber, and the energy output of one of the chambers. For the master oscillator chamber this is designated as $E_{MO}$. Other suitable parameters and/or combinations of parameters for estimating the amount of, or rate of consumption of, fluorine will be apparent to those of skill in the art.

As stated previously, in order to obtain the full benefit of the method described herein, it is desirable to have a method of controlling the fluorine level more accurately than has been done previously. Many prior art methods of fluorine control are actually biased by the long term ageing effects, i.e., they confuse normal fluorine depletion with ageing, and thus cannot decouple accurate fluorine control from the ageing effect. One such method of decoupling fluorine control from ageing effects is described in U.S. patent application Ser. No. 11/094,313, commonly owned by the assignee of the present application.

Figure 1:
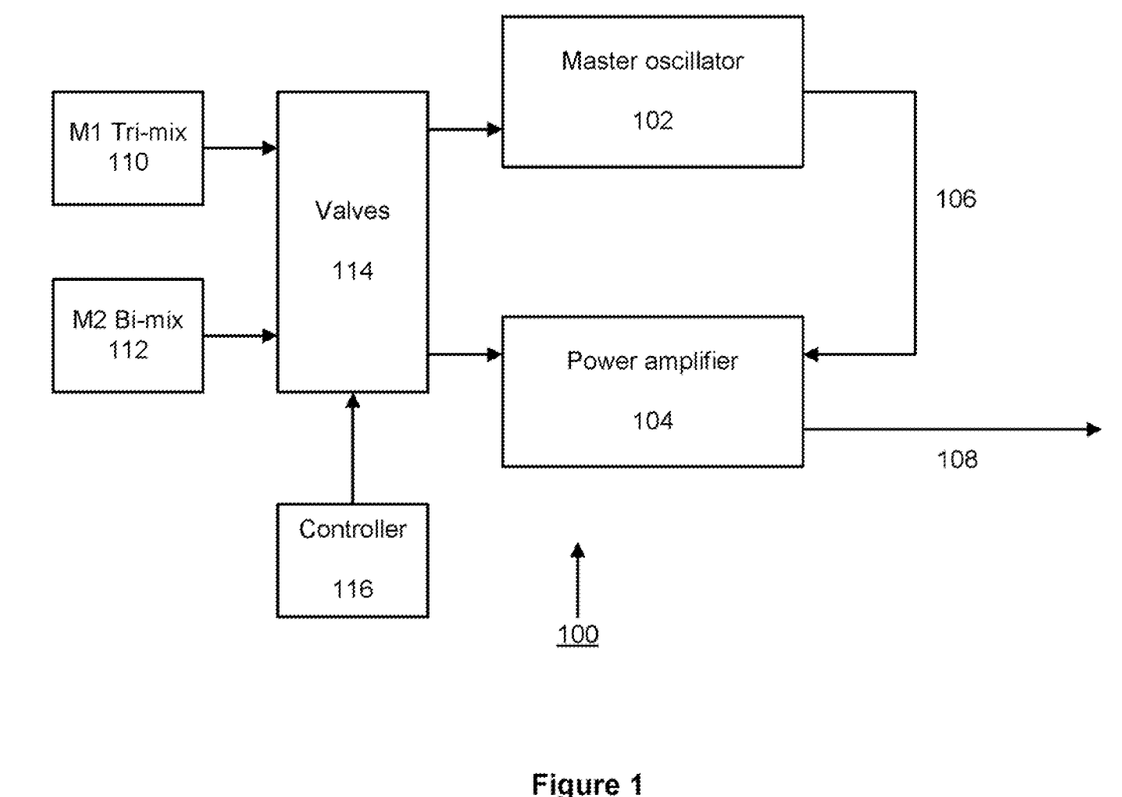
FIG. 1 shows a simplified block diagram of a gas replenishment system 100 for a dual chamber gas laser, such as a MOPA excimer laser, according to one embodiment.

A simplified block diagram of a gas replenishment system 100 for a dual chamber gas laser, such as a MOPA excimer laser, is shown in FIG. 1. The MOPA excimer laser has a master oscillator 102 containing a laser chamber, and a power amplifier 104 also containing a laser chamber. In operation, the master oscillator 102 produces a first laser beam 106 which is passed to the power amplifier 104 where it is amplified, to produce an amplified laser beam 108 which is output to a scanner machine (not shown) for use in lithography.

Each laser chamber contains a mixture of gases; for example, in a given excimer laser each laser chamber might contain a halogen, e.g., fluorine, along with other gases such argon, neon, (commonly known as rare gases) and possibly others in different partial pressures that add up to a total pressure P. For simplicity, the halogen gas is hereafter described as fluorine, although the principles described herein may be applied to other halogen gases as well.

Gas bottles 110 and 112 are connected to the master oscillator 102 and power amplifier 104 through valves 114 to allow for replenishment of the gas in the laser chambers when desired. Gas bottle 110 typically might contain a mixture of gases including fluorine, argon and neon, known as an "M1 mix," "tri-mix," or often simply "fluorine," while gas bottle 112 might contain a mixture of argon, neon and/or other gases, but no fluorine, known as an "M2 mix," "bi-mix," or "rare gas." A controller 116, such as a processor or logic circuit, operates the valves 114 to transfer gases from bottles 110 and 112 into the laser chambers of the master oscillator 102 and power amplifier 104 based upon certain data as described further herein.

As is known in the art, two bottles of gas are needed, since the fluorine in gas bottle 110 is at a particular concentration that is typically higher than that desired for laser operation. In order to add the fluorine to the laser chamber of the master oscillator 102 or power amplifier 104 at a desired lower concentration, the gas in bottle 110 must be diluted, and the non-halogen containing gas in bottle 112 is used for this purpose.

Although not shown, valves 114 typically include two valves for each laser chamber, an "injection" valve that allows gas to pass into and out of each chamber at a first rate, and a "chamber fill" valve that allows gas to pass into and out of each chamber at a second, and faster, rate. In addition, the laser chambers in the master oscillator 102 and power amplifier 104 contain blowers for mixing the gases that are in the chambers so that a homogenous mixture is maintained during operation. The blowers commonly also add heat to the gas.

As mentioned above, fluorine is consumed during operation of the laser. The resulting decrease in fluorine concentration typically causes a rise in the discharge voltage required to produce a laser pulse. In addition, changes in fluorine concentration also affect the delay time between the electrical discharges that cause production of the first laser beam 106 and the amplified laser beam 108; this delay time is often referred to as "dtMOPA."

Thus, the fluorine concentration must be replenished to keep the laser operating within desired parameters. Further, a satisfactory concentration of fluorine must be maintained while keeping the gas content in each laser chamber at a fixed pressure. Again, this is sometimes done by injects, i.e., partial replenishment of the gas in the chamber, rather than a full refill in which the chamber is purged and the gas completely replaced.

As with full refills, injects are typically done at fixed intervals, determined either by elapsed time between injects, or by the number of "shots," i.e., pulses of the laser, that have been generated. In some prior art systems, injects are done in each chamber after approximately every 1 million pulses by that chamber. For easier operation, the injects to the laser chambers are staggered, so that while each chamber receives an inject after about each million pulses, the power amplifier 104 receives an inject approximately 500,000 pulses after the master oscillator 102 receives an inject, and vice versa. Such timing of injects is described, for example, in U.S. Pat. No. 7,835,414, owned by the assignee of the present application.

While a full refill simply replaces all of the gas in the laser chamber, an inject is intended mainly to replace the amount of fluorine that has been consumed since the last refill or inject. Since it is mostly the fluorine that is consumed during operation, it is known in the prior art that injects to the laser chambers in both the master oscillator and power amplifier will include a fixed amount of the M2 mix, which contains no fluorine, and an amount of M1 mix containing enough fluorine to raise the concentration of fluorine in the chamber back to a desired level, thus replacing the fluorine which has been consumed.

However, as previously performed in the prior art, injects do not completely restore the operating condition of the laser to its peak or desired efficiency. Rather, the efficiency of the laser decreases over time, even with injects; this is believed to be primarily due to the degradation of optical elements from exposure to the laser pulses, but may also be due to other physics of laser operation.

Figure 2:
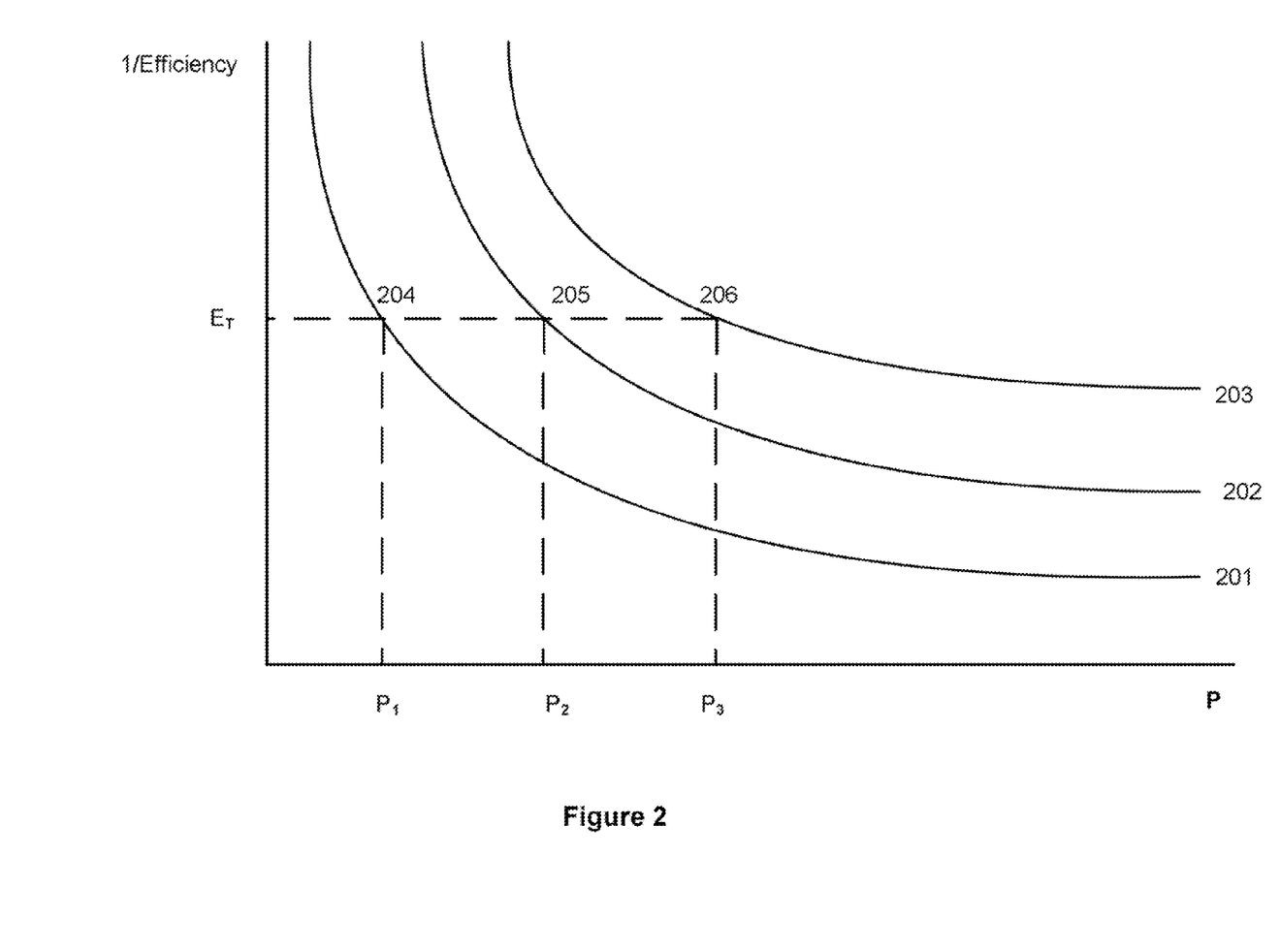
FIG. 2 shows the relationship between the pressure in a laser chamber of a dual chamber gas laser, such as a MOPA excimer laser, and the reciprocal of efficiency at different points in the life of the laser.

FIG. 2 shows an example of the relationship between the pressure in a laser chamber and the reciprocal of efficiency at different points in the life of the laser.

Because of the reduction of laser efficiency over time, a curve showing that relationship between efficiency and pressure, such as those shown in FIG. 2, typically moves up over time. Thus, a new laser might operate along the curve labeled 201. After some number of shots, the laser might operate with less efficiency along the curve labeled 202, and after still more shots the laser might operate along the curve labeled 203.

As shown in FIG. 2, in general the efficiency of the laser is higher (and thus the reciprocal of the efficiency is lower) at greater gas pressures, although this is only true up to the maximum chamber pressure at which the laser can operate. (There is also a minimum required pressure for the laser. Different lasers will have different maximum and minimum pressures.)

If it is desired to operate the laser at a particular target efficiency $E_T$, while a new laser operating along curve 201 can achieve this at a pressure $P_1$, an aged laser that operates along curve 202 will require a higher pressure $P_2$ to achieve the same efficiency. Similarly, an even older laser operating along curve 203 will require a still higher pressure $P_3$ to achieve the target efficiency, again assuming that $P_3$ is within the maximum operating pressure of the laser.

Thus, as shown in the example of FIG. 2, it can also be seen that the decrease in efficiency can be compensated for by increasing the pressure in the chamber, as long as the pressure remains less than the maximum chamber pressure. Thus, in one embodiment, when the efficiency of the laser drops below some minimum desired efficiency, the pressure in the chamber is increased until the efficiency rises to an acceptable level.

It is because of the maximum (and minimum) chamber pressure that accurate fluorine control is desirable for use with the method described herein. In the absence of good control of the fluorine, increasing the pressure in the chamber may result in the maximum (or minimum) pressure being reached more quickly, thus reducing the time over which the laser can operate with only injects.

Figure 3A:
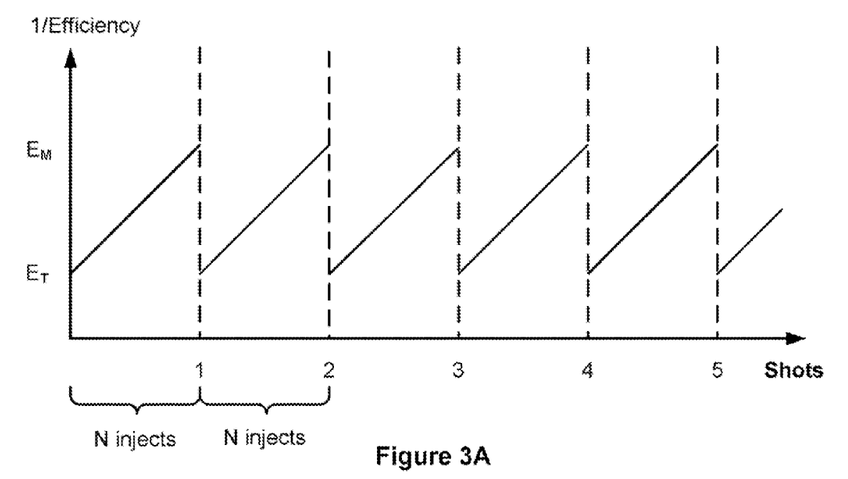
FIG. 3A illustrates the typical effect of continued shots and refills on the efficiency of a dual chamber gas laser, such as a MOPA excimer laser.

FIG. 3A illustrates the typical effect of continued shots and refills on the efficiency of a laser. The horizontal axis represents the shots fired by the laser, and the vertical axis the reciprocal of the efficiency of the laser.

It is assumed here that upon startup the laser is optimized to operate at some target efficiency $E_T$. The efficiency of the laser typically drops over time as shots are fired, and thus the reciprocal of efficiency increases as shown.

After some number N of injects, even with the replenishment of fluorine from the injects the efficiency of the laser has dropped to some minimum desired efficiency $E_M$. In the absence of some change from the known methods of performing injects, the efficiency of the laser will continue to decrease.

In the prior art, this problem is avoided by replacing all of the gas in the chamber by performing a refill in order to keep the laser operating within the desired range of efficiency. Thus, in FIG. 3A, after each N injects a refill is performed, as shown by points 1, 2, 3, 4, and 5 on the horizontal axis. At the conclusion of each refill, the as may be optimized, including adjustment of the pressure, until the efficiency of the laser is restored to a desired efficiency, here shown as the target efficiency $E_T$, and the efficiency then again decreases as the laser continues to fire shots. An automated process of gas optimization after a refill is shown in U.S. patent application Ser. No. 13/174,640, filed Jun. 30, 2011, and assigned to the assignee of the present application.

Figure 3B:
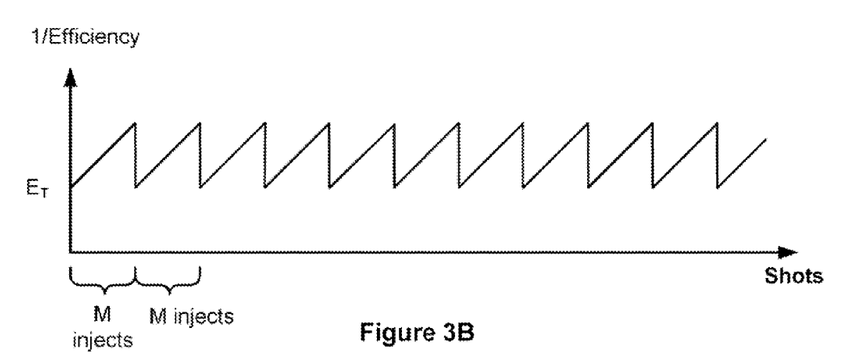
FIG. 3B illustrates a desired effect of maintaining the efficiency of a dual chamber gas laser, such as a MOPA excimer laser, as shown in FIG. 2A but without the use of refills of the gas in the laser chambers.

As explained previously, operation of the laser must stop during the refill process. Thus, it would be desirable to be able to restore the efficiency of the laser to its target efficiency $E_T$ (or some efficiency close to that) using only an inject of some type rather than a refill. FIG. 3B illustrates what a plot of the reciprocal of efficiency versus the number of shots fired might look like in such a case. Now there are no refills, but some other process that occurs periodically, for example after each M injects, and which would be able to at least substantially restore the efficiency of the laser without the need for a refill. (Note that M will typically be a different number than N as explained below.)

The increase in pressure in the chamber is obtained by reducing the size of the bleed at the end of an inject so that the pressure in the chamber after the inject is completed is at the higher level necessary to increase the efficiency of the laser as desired. After such an inject with a smaller bleed, injects are resumed in the normal fashion, with normal bleeds that reduce the pressure in the chamber to the new higher level at the end of each inject, until the efficiency of the laser has again dropped below the minimum desired efficiency.

Figure 4:
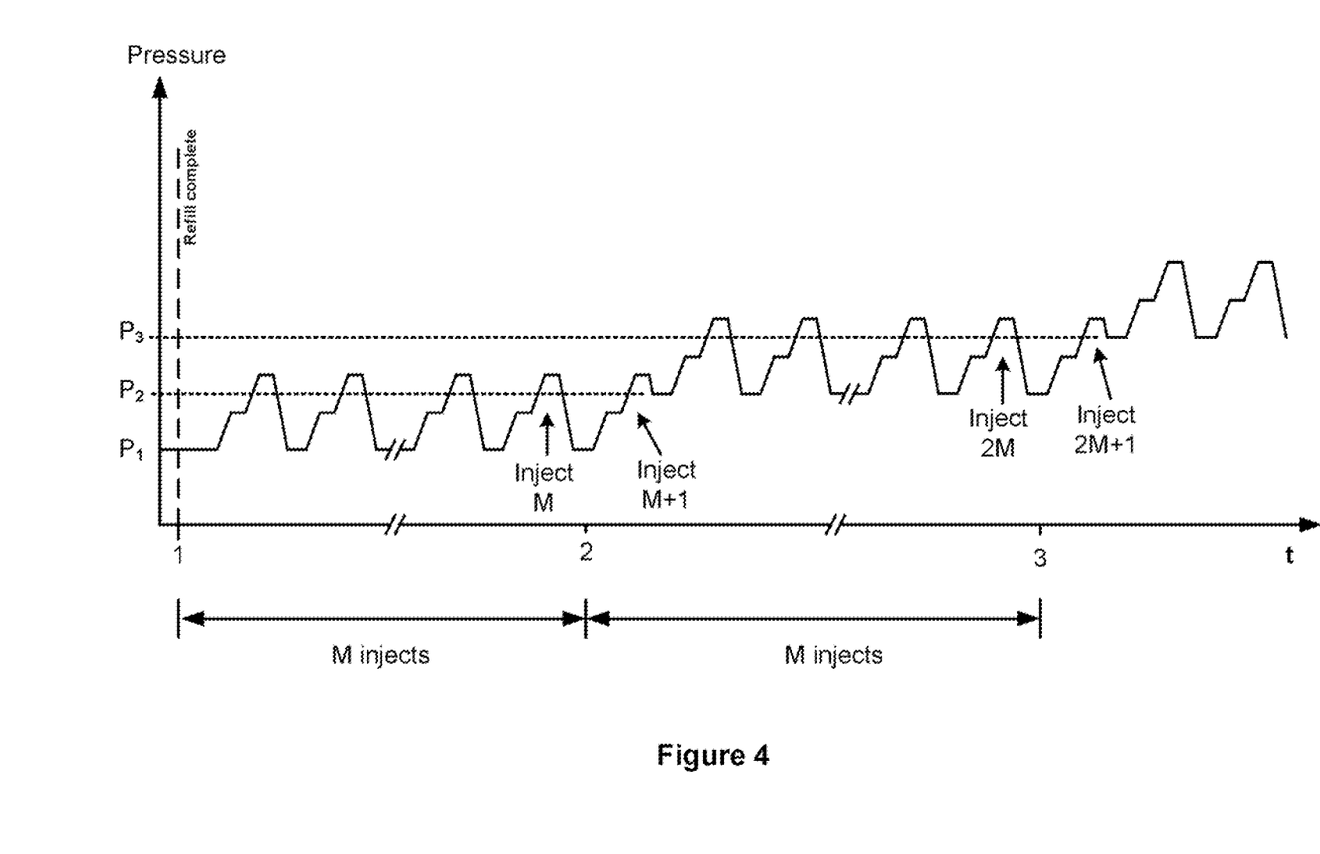
FIG. 4 shows the relationship between a series of injects and the resulting chamber pressure in a laser chamber of a dual chamber gas laser, such as a MOPA excimer laser, according to one embodiment.

This process may be seen in FIG. 4, which shows a series of injects and the resulting chamber pressure according to one embodiment. It is assumed that the injects begin after a refill of the laser chambers and optimization of the gas as described above. One of skill in the art will recognize that a typical inject actually includes three steps, as seen in more detail in FIG. 6: first, M1 mix is added to the chamber, followed by the addition of M2 mix to the chamber, both of which increase the pressure in the chamber, and finally the mixed gas is bled from the chamber to reduce the increased pressure back down to the desired pressure.

As seen in FIG. 4, after a refill is completed at point 1, the laser begins operating with a chamber pressure of $P_1$, and injects are performed at regular intervals as is known in the prior art. After some period of M injects, at point 2 the efficiency of the laser will fall to some minimum desired efficiency, as seen in FIG. 3B. The typical response to this in the prior art would be to purge the chamber of gas, refill it, and then optimize the gas as described above.

However, as stated above, in one embodiment of the present method, instead of a refill, when gas has been added to the chamber in the next inject M+1, the amount of gas bled from the chamber is reduced so that the pressure in the chamber does not drop back to $P_1$ as in the prior injects. As a result, at the end of this inject, the pressure in the laser chamber is now at a pressure $P_2$, which is higher than the previous pressure $P_1$. Injects are then performed normally to replenish the fluorine in the chamber and keep the chamber pressure at the increased pressure $P_2$, rather than the prior pressure $P_1$, as the laser continues to operate.

After another M injects, the efficiency of the laser will have fallen again. As was done after the first M injects, at the end of the next inject, inject 2M+1, the amount of gas bled from the chamber will again be reduced from the prior injects so that the pressure does not drop back to $P_2$, again resulting in an increase of pressure in the chamber to a new pressure $P_3$ which is higher than $P_2$, and thus again leading to an increase in the efficiency of the laser.

Thus, over the first M injects the pressure in the chambers will be $P_1$ as shown in FIG. 2, and over this period the efficiency of the laser will drop from its starting position of the target efficiency $E_T$ toward a minimum efficiency $E_M$ as shown in FIG. 3B. At the point labeled 2 on FIG. 4, inject M+1 raises the pressure in the chambers from $P_1$ to $P_2$ as shown on FIG. 2 and FIG. 4, and restores the efficiency to $E_T$ as shown at point 1 in FIG. 3B. Similarly, over the next M injects the pressure in the chambers will be $P_2$ (FIG. 2), and again the efficiency will drop as shots are fired (FIG. 3B). At point 3 on FIG. 4, inject 2M+4 will again raise the pressure in the chambers, now from $P_2$ to $P_3$, and again return the efficiency to the target efficiency $E_T$.

The values of M and N are somewhat arbitrary and will depend on the particular laser and the choices made by a laser operator or engineer. In some lasers, refills may be done approximately every 2 billion pulses, and injects approximately every million pulses, so that there may be about 2,000 injects in between refills (i.e., N=2000). In some embodiments of the present method, it is believed to be preferable to adjust the pressure as described more often than every 2,000 injects, in order to keep the efficiency of the laser closer to its optimal value than typically occurs between refills. It is believed that adjusting the pressure in the range of every 50 to 200 injects (i.e., 50≤M≤200) may result in smaller variations in the efficiency of the laser.

It may thus be seen that in principle it is possible to compensate for the aging of the laser by increasing the pressure in the chambers in this fashion. The question is thus how to determine how much to increase the pressure in order to obtain the proper compensation for the age of the laser.

In one embodiment, it is first determined how fast the efficiency of the laser deteriorates, and thus the relationship between the age of the laser and the change in the efficiency curves shown on FIG. 2, i.e., how many shots it takes for the laser's efficiency curve to move, for example, from curve 201 to curve 202, and from curve 202 to curve 203. This is considered the "aging rates" of the laser.

Next, to determine the ageing rate, first a parameter V is selected and measured. As above, while efficiency may be the easiest parameter to consider, other parameters may be used as well. Again, in one embodiment, when considering injects to the power amplifier chamber, V may be the discharge voltage, while in the case of the master oscillator chamber V it may be the delay time dtMOPA. In other embodiments, V may be some other measurement such as bandwidth, for example E95, the common voltage applied to both chambers, for example, at the peaking capacitor of a compression head of a solid state pulsed power system (SSPPM) for each chamber, or the energy output of one of the chambers such as $E_{MO}$ for the master oscillator chamber. Other suitable parameters and/or combinations of parameters for estimating the amount of, or rate of consumption of, fluorine will be apparent to those of skill in the art.

The value of V in general will be related to the amount of fluorine as well as the age of the laser. However, if the amount of fluorine can be accurately controlled and remains constant, then any change in the value of V ($\Delta V$ or dV) will only be due to the effect of ageing, and thus good fluorine control is desirable to obtain the maximum benefit of the described method. It is assumed hereafter that such control is present so that the amount of fluorine does remain approximately constant, so that the change of V is solely due to the ageing, i.e., the firing of shots, of the laser.

With approximately constant fluorine, measuring the change in V over a number of shots of the laser ($\Delta t$ or dt) results in a value dV/dt, the estimation of which will be apparent to one of skill in the art. One example of accurate fluorine control and the estimation of dV/dt is shown in U.S. patent application Ser. No. 13/251,181, filed on Sep. 30, 2011, and assigned to the assignee of the present application, which is incorporated herein by reference. Other methods of fluorine control and the estimation of dV/dt are present in the prior art.

Figure 5:
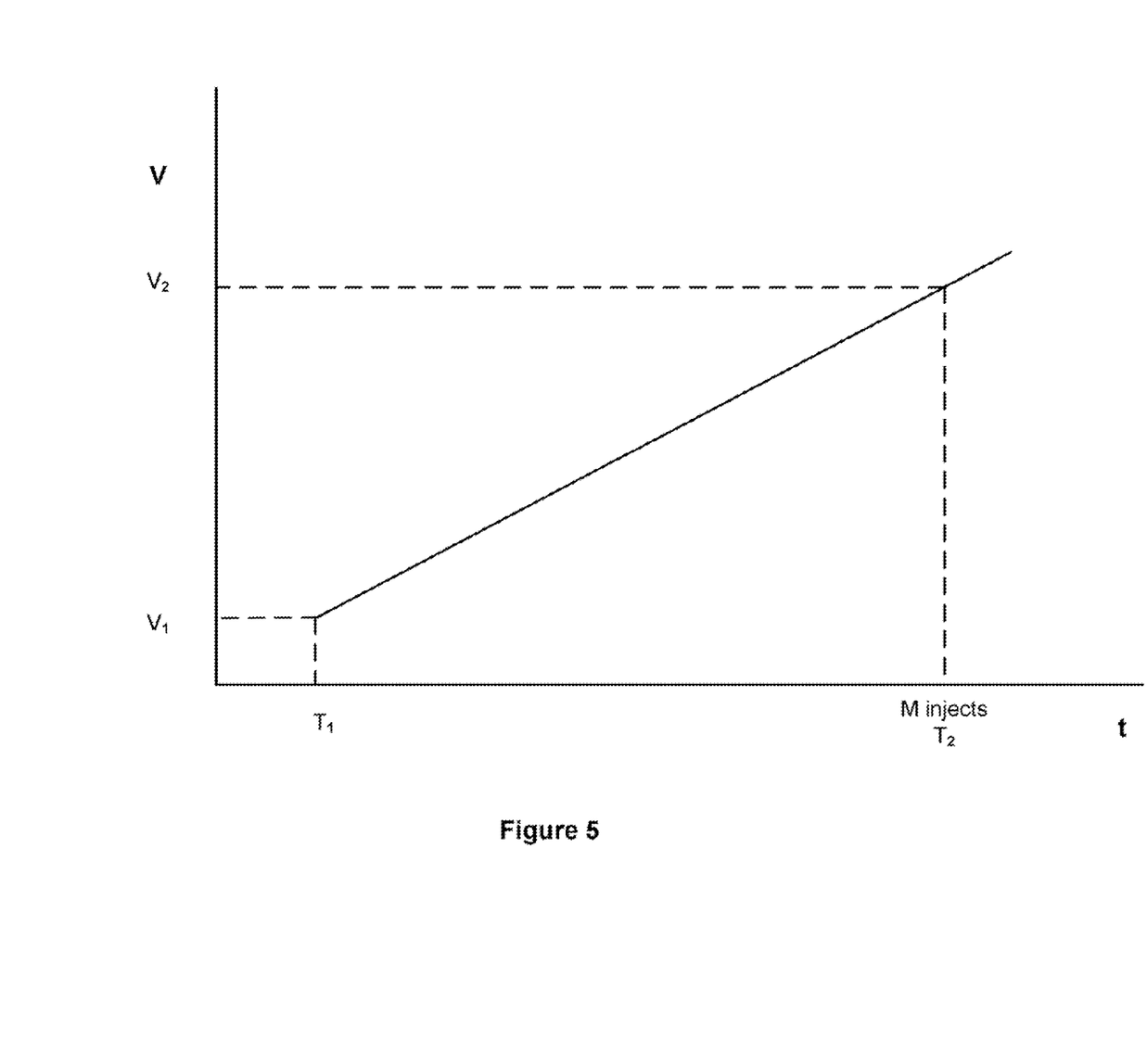
FIG. 5 is a graph of a laser parameter having a linear relationship to the length of operation of the laser.

In the simplest example, the value of dV/dt will be a constant, so that the value of V over time is simply a straight line having some slope, as shown in FIG. 5. As shown here, after M injects, the value of V changes from $V_1$ at time $T_1$ to $V_2$ at time $T_2$. (Injects typically occur at fixed intervals based on the number of shots of the laser.) To compensate for this change in V due to the ageing of the laser, it is desired to return the value of V to $V_1$.

Figure 6:
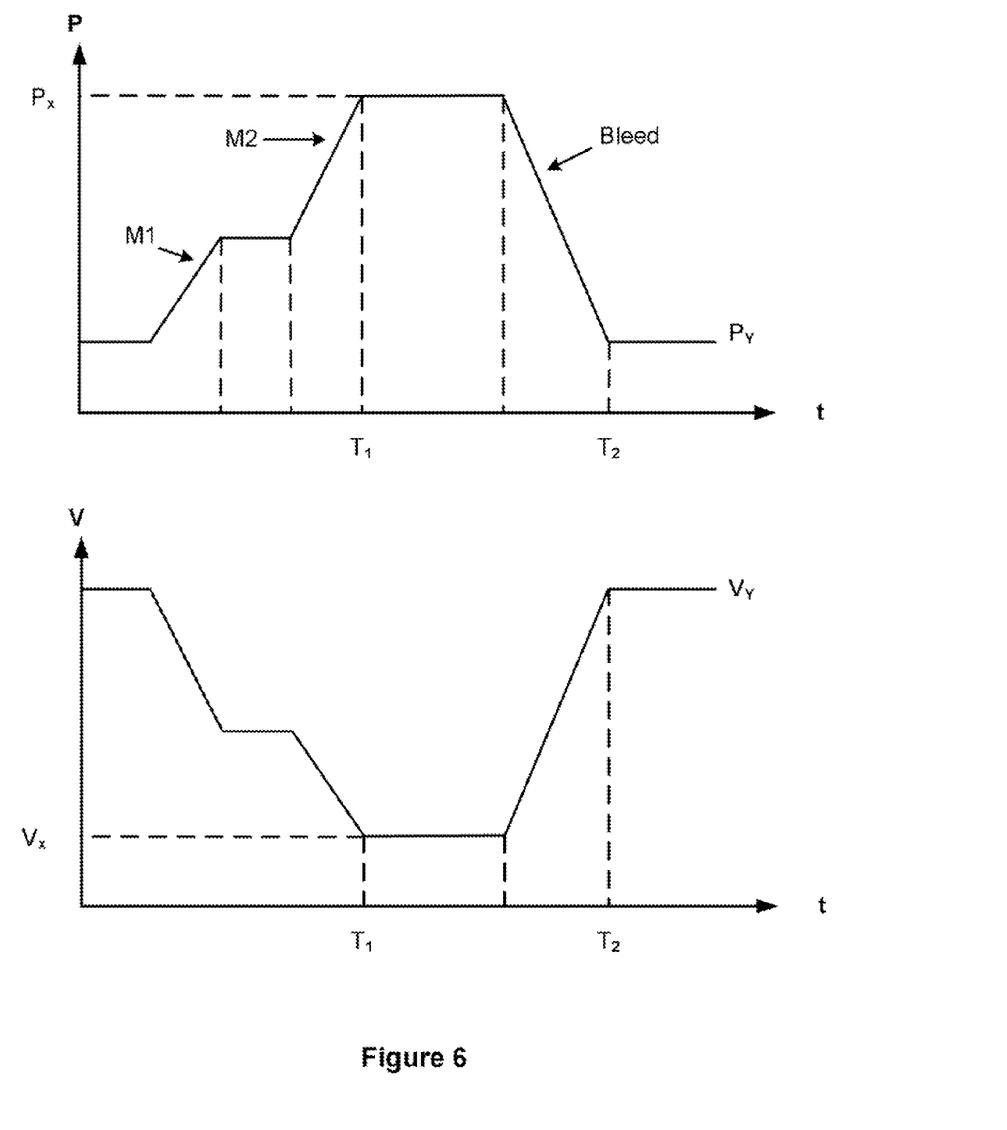
FIG. 6 shows a single inject in a in a laser chamber of a dual chamber gas laser, such as a MOPA excimer laser, and the measurement of the sensitivity of a parameter of laser operation to a change in pressure, according to one embodiment.

Next, the change in pressure required to return the value of V to $V_1$ is determined. The sensitivity of the parameter V to pressure, i.e., dV/dP, is first determined. In one embodiment, this is done by comparing the value of the signal V to the pressure in the chamber at certain points during the inject process as shown in FIG. 6. FIG. 6 shows a single inject, which includes the injection of M1 mix and the subsequent injection of M2 mix, which raises the pressure in the chamber to $P_X$, and then a bleed of the chamber to reduce the pressure to the desired pressure, here designated $P_Y$.

A value of V designated $V_X$ is measured at the time when the pressure is $P_X$, i.e., after the M1 and M2 mix have been injected, and again when the pressure is $P_Y$ (designated $V_Y$), i.e., after gas has been bled from the chamber to reduce the pressure to the desired pressure. The difference in the signal V is taken by calculating $V_X - V_Y$, as is the difference in pressure $P_X - P_Y$. The value of dV/dP is then given by:

$$\frac{dV}{dP} = \frac{V_X - V_Y}{P_X - P_Y}$$

Note that while FIG. 6 shows the value of V decreasing with increasing pressure, the opposite may be true, depending upon which particular parameter is selected as V.

As above, after M injects, the change in V is known or estimated (i.e., dV/dt times t, where t is again the number of shots fired), as shown in FIG. 5. If dV/dP is approximately constant during the period of the M injects, in the simplest approximation, the appropriate change in pressure that will compensate for the change in V is easily determined by:

$$V_2 - V_1 = \frac{dV}{dP}(P_2 - P_1)$$

where $V_1$ and $V_2$ are the values of V as measured at time $T_1$ and $T_2$ as above, and $P_1$ is the pressure at time $T_1$, and $P_2$ is the desired pressure at time $T_2$.

However, it is likely that dV/dP is not constant during the period, and thus in some embodiments, a more detailed determination of the value of dV/dP after M injects is desirable. In one embodiment, this may be accomplished by calculating dV/dP after each inject as shown in FIG. 6, and filtering the resulting values of dV/dP through a filter, for example, a low pass filter.

Thus, every M injects, another estimate of the current value of dV/dP is obtained from the values of dV/dP over the most recent M injects to get the new desired pressure. In general, as seen in FIG. 3, the described method will generally result in increasing the pressure in the chamber to compensate for the ageing of the laser. However, in some rare circumstances, it may be appropriate to reduce the pressure in the chamber. In such a case, the bleed of the next inject is simply extended until the pressure drops to the desired level.

In some cases, the value of dV/dP may vary very quickly, and the use of a low pass filter will tend to smooth out the variations and eliminate noise. It will be appreciated that such a low pass filter may also result in an estimate of dV/dP at a given moment that differs from the value of dV/dP calculated for the last inject. If the bandwidth of the filter is very small, most of the noise in the value of dV/dP will be eliminated, but if there is a large change in the value of dV/dP, the lag time for the output of the filter to catch up to the actual value of dV/dP is increased. One of skill in the art will appreciate how to select a filter to obtain a desired balance of noise reduction and convergence of the output value.

In some embodiments, it may be desirable to change the pressure by slightly less than what is calculated, i.e., to remove slightly less than the entire change in V, in order to allow for noise in the measurements.

The method described herein can be used with both chambers of a dual chamber laser. However, it will typically be desirable to use a different parameter V for each chamber, and the resulting pressures for efficient operation may be different for each chamber. For example, for the power amplifier laser chamber it may be appropriate to use the discharge voltage as the parameter V, while for the master oscillator chamber it may be preferable to use dtMOPA, the laser bandwidth, or E95. Alternatively, the injects to the PA chamber may remain fixed as described in co-pending application Ser. No. 13/098, 259, owned by the assignee of the current application, and the method described herein used only for the MO chamber.

Where a different parameter V is used for each chamber, the described calculations become somewhat more complicated due to the coupling effects between the chambers. While these effects are typically small, they are easily taken into account by the use of matrix inversion techniques that will be familiar to those of skill in the art.

Figure 7:
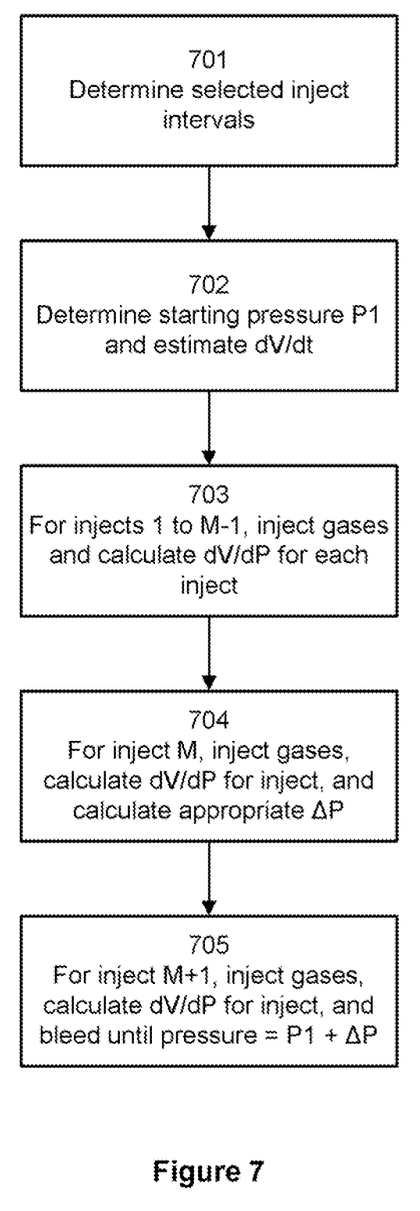
FIG. 7 is a simplified flowchart showing one embodiment of the gas replenishment method described herein.

FIG. 7 is a simplified flowchart showing one embodiment of the gas replenishment method described herein. As above, it is assumed that the laser chambers have been filled, and the gas optimized. At step 701, it is determined what inject intervals have been selected. As above, these may have been selected either by elapsed time or number of shots fired.

At step 702, the initial pressure P1 is determined, and dV/dt is estimated. Alternatively, dV/dt may be determined by measurement as explained herein as the injects occur.

For each of the first M−1 injects, gas is injected into the chamber, and dV/dP for the inject is calculated at step 703.

At step 704, for the Mth inject, gas is injected, dV/dP for the inject is calculated, and the change in pressure ΔP appropriate to compensate for the change in V over the N injects is calculated.

At step 705, during inject M+1, after the gases have been injected, the chamber is bled until the new desired pressure P2, i.e., P1+ΔP, is reached. Inject M+1 is also treated as the first inject for the next period of M injects, and the process repeats as long as the laser is operated, and the pressure stays within the minimum and maximum pressure at which the laser will operate.

In some embodiments, upon the commencement of laser operation after a refill or a significant pause in operation, for example over approximately an hour, it may be advantageous to wait for a small number of injects before performing the method of FIG. 7, in order to let any thermal transients that may arise die out and arrive at a steady state of operation. Thus, for example, it may be determined that for the first few injects, on the order of 5 to 10, dV/dt is not calculated, and that for a few more injects, on the order of 10 to 20, dV/dt is calculated but will not be used if the value appears to vary excessively. This may allow for a more accurate calculation of dV/dt, and thus for more accurate control of the laser efficiency with the described method.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above.

For example, it will be understood by those skilled in the art that while the preferred embodiment is a master oscillator-power amplifier multi-chambered excimer or molecular fluorine gas discharge laser system ("MOPA") the system may also be configured to have other oscillator/amplifier configurations, such as a master oscillator-power oscillator ("MOPO"), a power oscillator-power amplifier ("POPA") or a power oscillator-power oscillator ("POPO") configuration, or the like. It will also be understood that in each of such configurations the output of the first oscillator stage is amplified in some fashion in the second stage, regardless of whether the second stage is a power amplifier or a power oscillator.

Similarly, unless otherwise indicated specifically to the contrary reference to a master oscillator stage or chamber ("MO") in the Specification or the appended claims, and/or a power amplifier stage or chamber ("PA") in the Specification or appended claims, shall be considered to be broad enough to cover any oscillator first stage or chamber feeding an output into any amplifier second stage or chamber for amplification, and the term oscillator chamber or oscillator stage is broad enough to cover any such oscillator stage and the term amplifier chamber or stage is broad enough to cover any such amplifier stage. Further, while the above description uses a two stage or chamber laser as an example, the system and method disclosed might also be applied to a single chamber laser or any multi-chamber laser.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc. The methods may also be incorporated into hard-wired logic if desired. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A dual chamber gas discharge laser light source, comprising:
   a master oscillator having a laser chamber containing a lasing medium gas comprising a halogen;
   an amplifier having a laser chamber containing a lasing medium gas comprising a halogen; and
   a gas replenishment system including a controller configured to perform a replenishment scheme in a selected laser chamber at inject opportunities occurring at regular intervals, the replenishment scheme comprising:
      injecting into the selected laser chamber at each inject opportunity a quantity of a non-halogen containing gas and a quantity of the halogen containing gas estimated to result in a desired amount of halogen gas in the selected laser chamber after the inject opportunity; and
      after each M injects, where M is a predetermined number greater than 1, increasing a total operating pressure in the selected laser chamber for a next number of multiple injects to compensate for any change in the efficiency of the laser due to the length of operation of the laser.

2. The dual chamber gas discharge laser light source of claim 1 wherein the replenishment scheme further comprises:
   measuring an operating parameter of the selected laser chamber that is indicative of the efficiency of the laser during each injection of gas into the selected laser chamber;
   estimating a ratio of the change of the measured operating parameter to the number of shots fired by the laser;
   measuring a change in total pressure in the selected laser chamber during each inject opportunity;
   determining a ratio of the change of the measured operating parameter to the change in total pressure in the selected laser chamber;
   after each M injects:
      estimating a change in the operating parameter over the M injects; and
      estimating the total operating pressure in the selected laser chamber that is appropriate to reverse the change in the operating parameter over the M injects; and wherein increasing the total operating pressure in the selected laser chamber further comprises increasing the total operating pressure to the estimated total operating pressure.

3. The dual chamber gas discharge laser light source of claim 2 wherein the selected laser chamber is the amplifier laser chamber and the operating parameter is the discharge voltage in the amplifier laser chamber.

4. The dual chamber gas discharge laser light source of claim 2 wherein the selected laser chamber is the master oscillator laser chamber and the operating parameter is the discharge timing differential between the master oscillator and amplifier.

5. The dual chamber gas discharge laser light source of claim 2 wherein the selected laser chamber is the master oscillator laser chamber and the operating parameter is the bandwidth of the laser light source.

6. The dual chamber gas discharge laser light source of claim 2 wherein the selected laser chamber is the master oscillator laser chamber and the operating parameter is E95.

7. The dual chamber gas discharge laser light source of claim 1 wherein the halogen comprises fluorine.

8. The dual chamber gas discharge laser light source of claim 1 wherein the regular intervals for inject opportunities are determined by factors comprising one or both of elapsed time and shot count.

9. The dual chamber gas discharge laser light source of claim 1 wherein the value of M is between approximately 50 and approximately 200.

10. The dual chamber gas discharge laser light source of claim 1, wherein the replenishment scheme which the controller in the gas replenishment system is configured to perform further comprises, prior to injecting into the selected laser chamber at each inject opportunity a quantity of the halogen gas:
estimating a quantity of the halogen gas which will result in a desired amount of halogen gas in the selected laser chamber after the inject opportunity.

11. The dual chamber gas discharge laser light source of claim 10 wherein estimating the amount of halogen gas in the chamber after an inject opportunity further comprises modeling the amount of halogen gas in the selected laser chamber at a selected point after the inject opportunity and before the immediately subsequent inject opportunity.

12. A method of replenishing gas in a dual chamber gas discharge laser light source having a master oscillator and an amplifier, each of the master oscillator and amplifier having a laser chamber containing a lasing medium gas comprising a halogen, the method comprising the steps of:
selecting a plurality of inject opportunities occurring at regular intervals;
injecting into a selected laser chamber at each inject opportunity a quantity of a non-halogen containing gas and a quantity of the halogen containing gas estimated to result in a desired amount of halogen gas in the selected laser chamber after the inject opportunity; and
after each M injects, where M is a predetermined number greater than 1, increasing a total operating pressure in the selected laser chamber for a next number of multiple injects to compensate for any change in the efficiency of the laser due to the length of operation of the laser.

13. The method of replenishing gas of claim 12 wherein further comprising:
measuring an operating parameter of the selected laser chamber that is indicative of the efficiency of the laser during each injection of gas into the selected laser chamber;
estimating a ratio of the change of the measured operating parameter to the number of shots fired by the laser;
measuring a change in total pressure in the selected laser chamber during each inject opportunity;
determining a ratio of the change of the measured operating parameter to the change in total pressure in the selected laser chamber;
after each M injects:
estimating a change in the operating parameter over the M injects;
estimating the total operating pressure in the selected laser chamber that is appropriate to reverse the change in the operating parameter over the M injects; and
wherein increasing the total operating pressure in the selected laser chamber further comprises increasing the total operating pressure to the estimated total operating pressure.

14. The method of replenishing gas of claim 13 wherein the selected laser chamber is the amplifier laser chamber and the operating parameter is the discharge voltage in the amplifier laser chamber.

15. The method of replenishing gas of claim 13 wherein the selected laser chamber is the master oscillator laser chamber and the operating parameter is the discharge timing differential between the master oscillator and amplifier.

16. The method of replenishing gas of claim 13 wherein the selected laser chamber is the master oscillator laser chamber and the operating parameter is the bandwidth of the excimer laser light source.

17. The method of replenishing gas of claim 13 wherein the selected laser chamber is the master oscillator laser chamber and the operating parameter is E95.

18. The method of replenishing gas of claim 12 wherein the halogen comprises fluorine.

19. The method of replenishing gas of claim 12 wherein selecting the plurality of inject opportunities further comprises selecting the regular intervals based upon factors comprising one or both of elapsed time and shot count.

20. The method of replenishing gas of claim 12 wherein the value of M is between approximately 50 and approximately 200.

21. The method of replenishing gas of claim 12, further comprising, prior to injecting into the selected laser chamber at each inject opportunity a quantity of the halogen gas:
estimating a quantity of the halogen gas which will result in a desired amount of halogen gas in the selected laser chamber after the inject opportunity.

22. The method of replenishing gas of claim 21 wherein estimating the amount of halogen gas in the selected laser chamber after an inject opportunity further comprises modeling the amount of halogen gas in the selected laser chamber at a selected point after the inject opportunity and before the immediately subsequent inject opportunity.

23. A non-transitory computer-readable medium having embodied thereon a program, the program being executable by a processor to perform a method of replenishing gas in a dual chamber gas discharge laser light source having a master oscillator and an amplifier, each of the master oscillator and amplifier having a laser chamber containing a lasing medium gas comprising a halogen, the method comprising the steps of:
selecting a plurality of inject opportunities occurring at regular intervals;
injecting into a selected laser chamber at each inject opportunity a quantity of a non-halogen containing gas and a quantity of the halogen containing gas estimated to result in a desired amount of halogen gas in the selected laser chamber after the inject opportunity;

measuring an operating parameter of the selected laser chamber that is indicative of the efficiency of the laser during each injection of gas into the selected laser chamber;

estimating a ratio of the change of the measured operating parameter to the number of shots fired by the laser;

measuring a change in total pressure in the selected laser chamber during each inject opportunity;

determining a ratio of the change of the measured operating parameter to the change in total pressure in the selected laser chamber; and after each M injects, where M is a predetermined number greater than 1:
 estimating a change in the operating parameter over the M injects;
 estimating a total operating pressure in the selected laser chamber that is appropriate to reverse the change in the operating parameter over the M injects; and increasing the total operating pressure in the selected laser chamber to the estimated total operating pressure for a next number of multiple injects.

\* \* \* \* \*